US006631032B2

(12) United States Patent
Ryutov et al.

(10) Patent No.: US 6,631,032 B2
(45) Date of Patent: Oct. 7, 2003

(54) RENEWABLE LIQUID REFLECTION GRATING

(75) Inventors: Dmitri D. Ryutov, Livermore, CA (US); Arthur Toor, Waldport, OR (US)

(73) Assignee: The Regents of the University of California, Oakland, CA (US)

(*) Notice: Subject to any disclaimer, the term of this patent is extended or adjusted under 35 U.S.C. 154(b) by 22 days.

(21) Appl. No.: 10/027,722

(22) Filed: Dec. 19, 2001

(65) Prior Publication Data

US 2002/0118458 A1 Aug. 29, 2002

Related U.S. Application Data

(60) Provisional application No. 60/258,192, filed on Dec. 22, 2000.

(51) Int. Cl.[7] .......................... G02B 26/00; G02B 5/18
(52) U.S. Cl. ................. 359/573; 359/569; 359/572; 359/290; 359/291; 359/295; 359/900
(58) Field of Search ................................ 359/573, 900

(56) References Cited

U.S. PATENT DOCUMENTS

| | | | | |
|---|---|---|---|---|
| 3,385,991 A | * | 5/1968 | Towlson ..................... | 313/441 |
| 3,485,550 A | * | 12/1969 | De Haller et al. | |
| 3,653,742 A | | 4/1972 | Buchan | |
| 4,011,009 A | * | 3/1977 | Lama et al. ................. | 359/571 |
| 4,909,626 A | | 3/1990 | Purvis et al. | |
| 4,958,919 A | | 9/1990 | Sigler | |
| 5,033,831 A | | 7/1991 | Sigler | |
| 5,194,880 A | * | 3/1993 | Elrod et al. .................... | 347/46 |
| 5,447,147 A | * | 9/1995 | Stirbl et al. .................. | 126/714 |
| 5,532,880 A | | 7/1996 | Robb | |
| 5,650,880 A | | 7/1997 | Shuter et al. | |
| 5,687,022 A | | 11/1997 | Robb | |
| 6,381,061 B2 | * | 4/2002 | Levola ....................... | 359/291 |

FOREIGN PATENT DOCUMENTS

RU 409116 A * 6/1974

OTHER PUBLICATIONS

W.M. Klipstein, et al., "Thermally excited liquid surface waves and their study through the quasielastic scattering of light", Amer. J. Phys., vol. 64, No. 6, pp. 785–765, Jun. 1996. (abstract only).*
Ragazzoni, et al., "A liquid adaptive mirror," Astronomy and Astrophysics, 283, L–17–L–19 (3 pages) (1994).
Ragazzoni, et al., "Electromagnetic driven liquid mirrors," SPIE vol. 2263, pp. 379–385 (7 pages) (1994).
Hong, et al., "Magneto–chromatic effects of tunable magnetic fluid grating," Journal of Applied Physics, vol. 83, No. 11, pp. 6771–6773 (3 pages) (Jun. 1, 1998).
Horng, et al., "Magnetochromatics resulted from optical gratings of magnetic fluid films subjected to perpendicular magnetic fields," Journal of Applied Physics, vol. 88, No. 10, pp. 5904–5908 (5 pages) (Nov. 15, 2000).
Ryutov, et al., "Optical elements based on the use of renewable liquid films with magneto–electrostatic control," Review of Scientific Instruments, vol. 72, No. 11, pp. 4042–4054 (13 pages). Nov. 2001.
Toor, et al., "Renewable liquid zone plate for 8 keV X rays," UCRL–JC–141769–ABS, Lawrence Livermore National Laboratory, (2 pages) (2000).

* cited by examiner

Primary Examiner—John Juba
(74) Attorney, Agent, or Firm—Eddie E. Scott; Alan H. Thompson

(57) ABSTRACT

A renewable liquid reflection grating. Electrodes are operatively connected to a conducting liquid in an arrangement that produces a reflection grating and driven by a current with a resonance frequency. In another embodiment, the electrodes create the grating by a resonant electrostatic force acting on a dielectric liquid.

23 Claims, 2 Drawing Sheets

RENEWABLE LIQUID REFLECTION GRATING

CROSS-REFERENCE TO RELATED APPLICATIONS

This application claims the benefit of U.S. Provisional Application No. 60/258,192, filed Dec. 22, 2000, and entitled "Renewable Thin-Liquid-Film Reflecting Apparatus," which is incorporated herein by this reference. U.S. patent application Ser. No. 10/028,411, filed Dec. 19, 2001 entitled "Universally Oriented Renewable Liquid Mirror" and U.S. patent application Ser. No. 10/028,418, filed Dec. 19, 2001 entitled "Renewable Liquid Reflecting Zone Plate" describing related inventions are being filed simultaneously with this application. The specification, drawings, and disclosure of U.S. patent application Ser. No. 10/028,411, filed Dec. 19, 2001 entitled "Universally Oriented Renewable Liquid Mirror" and U.S. patent application Ser. No. 10/028,418, filed Dec. 19, 2001 entitled "Renewable Liquid Reflecting Zone Plate" are incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to reflection gratings and more particularly to a liquid reflection grating for high-intensity optical systems.

2. State of Technology

Reflection gratings are produced by mechanical ruling into metals. High groove density (up to 1800 lines/mm) gratings are also produced in dielectric materials (e.g., glass) by mechanical ruling. These gratings can produce high diffraction efficiency by overcoating with thin metallic films. High cost of such gratings prevents them from being used in high-power pulsed optical systems, where the grating would be damaged within one pulse or several pulses.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a renewable liquid reflection grating. Electrodes are operatively connected to a conducting liquid and driven by an AC voltage with a properly chosen frequency in an arrangement that produces a reflection grating. The liquid can be quickly renewed after every pulse. This invention allows using diffraction gratings in high-power pulsed lasers, including the ones operating in rep-rate mode.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
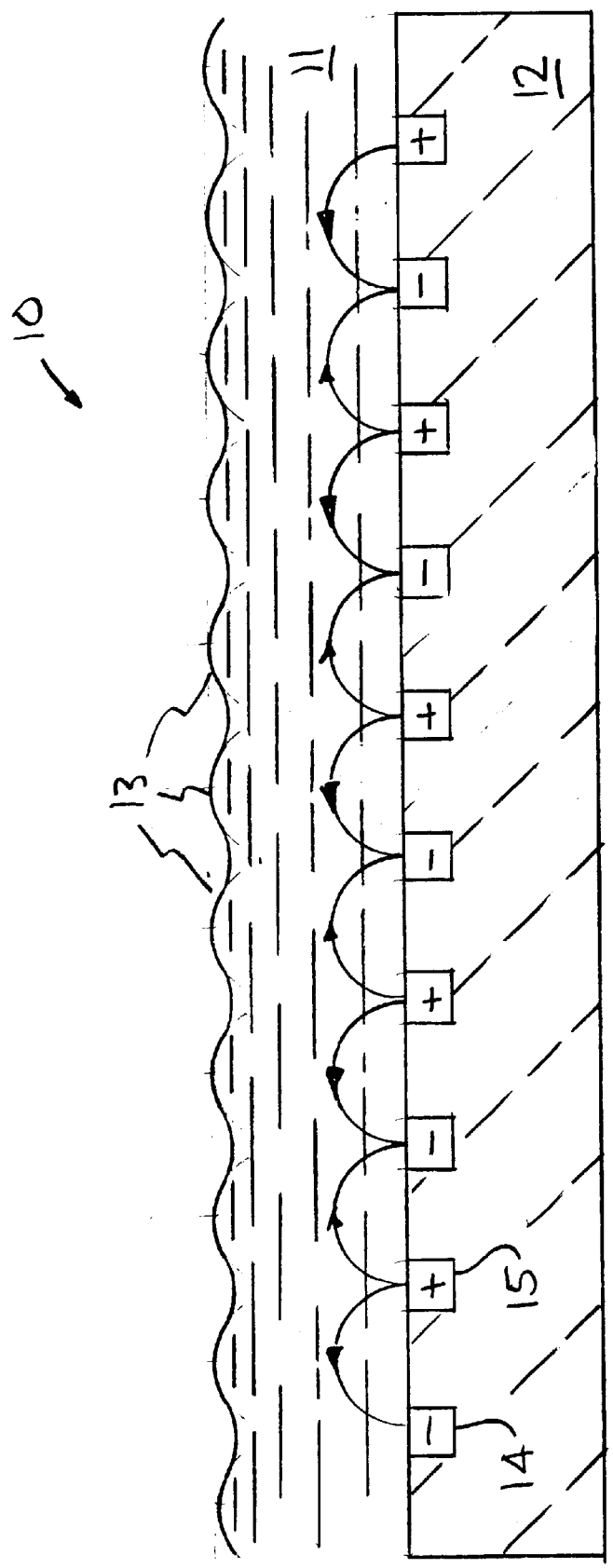
FIG. 1 illustrates an embodiment of a liquid thin film reflection grating.

Referring now to the drawings, to the following detailed information, and to incorporated materials, a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, a system, generally designated by the reference numeral 10, is illustrated for exciting capillary waves on the surface of a conducting liquid film 11 to create a reflection grating with micron-scale structure. An array of thin parallel wires 14 and 15 are positioned on the surface of a dielectric substrate 12. The wire array 14 and 15 is then covered with a thin (a few micrometers thick) conducting liquid film 11. The liquid 11 shown in FIG. 1 is mercury. In another embodiment of the invention the liquid is gallium. In other embodiments of the invention the fluid is composed of other materials that provide reflectivity. The fluid in other embodiments can be conducting liquids including Gallium, and NaK alloy (40 to 90% of K).

A constant magnetic field of ~1T strength (created by permanent magnets) oriented along the wires is imposed. A sinusoidal voltage is then applied between the neighboring wires with the frequency resonating with capillary surface wave. This current interacts with the external magnetic field and drives the resonant surface wave. To create a grating with micron-scale structure will require frequency in the range 1–10 MHz. In embodiments that will be subsequently described, the liquid film will be renewed after each pulse either by a lateral flow, or by pressing a working fluid in and out through a porous substrate.

The possibility of a quick renewing of the grating makes this concept especially interesting for high intensity laser applications, where damage to the optical elements is a well-known design constraint. Destruction of a grating may occur during one pulse (at highest intensities), or via a gradual damage due to the thermal fatigue in the rep-rate mode. In particular, the Linac Coherent Light Source (LCLS) to be built in SLAC will generate X-ray pulses with the energy ~10 mJ per pulse, with the X-ray beam diameter ~100 mm, pulse width ~200 fs, and the rep rate ~100 Hz. Such pulses will cause surface damage even for incidence angles of a few milli-radians. Other systems where damage to the optical elements is a serious problem, include rep-rate lasers for commercial applications, as well as pulsed lasers for scientific research.

We propose a concept of a renewable liquid reflecting grating that can be used at high fluences, with no damage to the permanent elements of the structure. Creation of liquid gratings is valuable for high brightness light sources, such as the DOE facilities at Argonne and the Lawrence Berkeley National Laboratories and the already mentioned Linac Coherent Light Source. The embodiment that will subsequently described include the ability to renew the grating in situ between successive pulses of light that are sufficiently intense to cause damage. The renewable liquid gratings can be used as elements of optical diagnostics in high-energy-density experiments, like the National Ignition Facility at Lawrence Livermore National Laboratory, Z facility at Sandia, and others, where these gratings could be placed much closer to the point of the energy release than conventional solid-state gratings.

Referring again to the drawings, an array of thin parallel wires plated or otherwise placed on the surface of the dielectric substrate with the wires being in electrical contact with the conducting working fluid is shown in FIG. 1. Permanent magnets are used to impose a constant magnetic field of B~1 T strength oriented along the wires. A sinusoidal voltage is applied between the neighboring wires and will drive the current in the conducting fluid. Interaction of this current with the external magnetic field will excite a capillary wave on the surface of the film.

Imposing a relatively high external magnetic field B allows the reduction of the currents and, thereby, Joule heating in the conducting film. The wavelength of the capillary wave will be equal to twice the inter-wire distance. The phasing shown in FIG. 1 corresponds to a standing wave; generation of the traveling wave is also possible. Creation of reflection gratings with 10 $\mu$m period requires a voltage frequency in the range of 0.5 MHz (for mercury as working fluid). The thickness of the film cannot be much greater than 1/k, where k is the wave number corresponding to the grating period; otherwise, perturbations produced by the currents flowing near the bottom will be too weakly coupled with surface perturbations. To reduce requirements to the current density, the frequency of the current is chosen to coincide with the frequency of the capillary wave with the spatial period equal to that of the wire array (i.e., two inter-wire distances in the case shown in FIG. 1).

Equations subsequently presented allow the evaluation of the current density required for the excitation of the surface wave of a given amplitude. To create resonant surface perturbations with an amplitude of 0.5 $\mu$m for the grating with the period of 10 $\mu$m, one needs to drive a current of the order of 30 kA/cm$^2$ in the pulse with duration 10–20 microseconds (~10–20 wave periods). The grating can be considered as a "static" grating if the laser pulse length is significantly shorter than the temporal period of the applied voltage. For lasers with pulse-width less than a fraction of microsecond, this condition is satisfied with significant margin. The driving pulse should be synchronized in such a way as to provide the maximum amplitude of the surface perturbation at the time of the arrival of the laser pulse. In the frequency range of hard X rays, the optical elements, including gratings, will have to operate in the grazing-incidence mode. In this case, the grating efficiency will become significant even at a relatively low amplitude of the surface modulation. For the incidence angle $\theta$ (measured from the surface of the unperturbed liquid film) the efficiency of order of 1 will be reached at the amplitude of the surface modulation ~$\theta$/k. For a grating with the period of 1 $\mu$m, and the incidence angle of 10 mrad, the required amplitude is equal to ~10 Å. This allows the reduction of the driving current. The Joule heating of the film in the example discussed is moderate, $\Delta$T less than 1 degree Kelvin.

Limitations on the intensity of the incident laser radiation are two-fold: reflective properties of the film should not deteriorate significantly during the laser pulse; mechanical perturbations created in the film by the heating of the surface layer during the pulse should not damage the substrate with embedded wires. Renewal of the film in this scheme can be accomplished by creating a flow of liquid in the direction of the wires (and whence, along the external magnetic field). This flow can be created by a slight tilting of the film. An alternative method, which would allow a faster renewal, is using a porous substrate and pressing the fluid through the pores and then pulling it back, as in the scheme presented in U.S. patent application Ser. No. 10/028,411, filed Dec. 19, 2001 entitled "Universally Oriented Renewable Liquid Mirror" describing related inventions that is being filed simultaneously with this application.

Using the Electromagnetic Drive

A surface perturbation is generated by a resonant J×B force. An array of thin parallel wires is placed on the surface of the dielectric substrate (in precisely machined grooves), with the wires being in electric contact with mercury as shown in FIG. 1. We impose a constant magnetic field of $B_0$~10 kG strength, oriented along the wires. Such a field can be created by permanent magnets. A sinusoidal voltage will be applied between the neighboring wires and will drive the current in mercury. Interaction of this current with the external magnetic field will excite a capillary wave on the surface of the film. The wavelength will obviously equal to the doubled inter-wire distance. To be specific, we consider the phasing that corresponds to a standing wave (although generation of the traveling wave is also possible). To reduce the requirements to the current density, we choose the frequency of the current to coincide with the frequency of the capillary wave with the desired period (determined by the distances between the neighboring wires). The creation of reflection gratings with 10 $\mu$m period will require a drive frequency in the range of 0.5 MHz.

We assume that the thickness of the film is not very much larger than 1/k; otherwise, perturbations produced by the currents flowing near the bottom will be too weakly coupled with surface perturbations. To be specific, we assume that the thickness is $$h = A/k, \qquad\qquad\qquad \text{(Equation 1)}$$

with the numerical coefficient A being equal 2–3.

The time for the magnetic diffusion over the thickness h, $$\tau_{magn} = \frac{h^2}{2D_m}, \qquad\qquad\qquad \text{(Equation 2)}$$

where $D_m$ is the magnetic diffusivity, is quite short. For the mercury and h=5 $\mu$m it is less than 1 ns; in other words, the current is distributed resistively, and isn't strongly localized near the substrate: it flows over the whole thickness of the liquid film. If the current per unit length of the wire is J, then the parallel to the surface component of the current density is j~J/h. The vertical force acting per unit volume of the film can then be evaluated as $$f_z \sim \frac{jB_0}{c},\quad \text{(Equation 3)}$$

where $B_0$ is the external magnetic field, and we are using CGS units. Consider first the static case, where the inter-wire voltage (and, accordingly, j) does not vary with time. The vertical force of Equation 3, integrated over the film thickness, is then balanced by the surface tension, so that $$f_z h \sim \alpha k^2 \xi_0,\quad \text{(Equation 4)}$$

where $\xi_0$ is the surface deformation in the static case. From previous equations one finds that $$\xi_0 \sim \frac{jB_0 h}{\alpha k^2 c} \sim \frac{jB_0 A}{\alpha k^3 c},\quad \text{(Equation 5)}$$

where we have used Equation 3.

To reduce requirements to the driving current, we will exploit the resonance excitation, in other words, we will adjust the frequency of the current to be equal to the eigenfrequency of the capillary wave with the wavelength determined by the period of the exciting force (two inter-wire distances). For the sinusoidal dependence of the exciting force over the time, one has:

$$\xi'' + 4\nu k^2 \xi' + \omega_0^2 \xi = \omega_0^2 \xi_0 \cos \omega t \quad \text{(Equation 6)}$$

The second term describes viscous damping. If the frequency $\omega$ coincides with the resonant frequency $\omega_o$, the amplitude of the surface oscillations can be evaluated as $$\xi \approx \xi_0 \frac{\omega_0}{\max(4\nu k^2, 1/\Delta t)} \quad \text{(Equation 7)}$$

Here we have taken into account that, in some cases, the duration $\Delta t$ of the wave-train in the wire array may be shorter than the inverse damping time. In particular, this may be the case when the viscous damping is small.

For the 10 $\mu$m wavelength (k=6.28·10³ cm⁻¹) in mercury, one has $\omega_0 \approx 3 \cdot 10^6$ s⁻¹, and $4\nu k^2 \approx 1.8 \cdot 10^5$ s⁻¹. Therefore, for a driving pulse duration $\Delta t$ exceeding 10–20 $\mu$s, the amplitude of the surface perturbations will be ~15 times higher than the amplitude of static perturbations $\xi_0$.

Assume that the wave amplitude is approaching nonlinear state, with $k\xi \sim 0.3$ (or, in other words, peak-to-valley distance equal to 0.1 of the wavelength), meaning that $\xi_0 \sim 0.02/k \sim 3 \cdot 10^{-6}$ cm. Equation (5), with A=2.5, and $B_0$=10 kG yields then the following expression for the required current density: $j \sim 10^{14}$ CGS~30 kA/cm². The resulting magnetic field perturbation is $\Delta B \sim 10$ G. The forces acting upon the fluid can be evaluated in terms of the magnetic pressure perturbation, $B_0 \Delta B/4\pi$, which is in the range of 0.1 atm. It is small enough not to cause cavitation (in the regions where the pressure perturbation is negative).

The grating can be considered as a "static" grating if the laser pulse length is significantly shorter than the temporal period of the capillary waves. For lasers with pulse-width less than a fraction of microsecond, this condition is satisfied with significant margin. The driving pulse should be synchronized in such a way as to provide the maximum amplitude of the surface perturbation at the time of the arrival of the pulse.

Heating of Conductors and of the Working Fluid

The thermal conduction time over the thickness of the film, $\tau \sim h^2/2\chi$, with $\chi$ being the thermal diffusivity, is typically shorter than the driving pulse length. For a mercury film 5 $\mu$m thick, $\tau\tau$ is ~10⁻⁵ s, less than the expected duration of the driving pulse. Assuming the worst-case scenario of one-sided cooling, from the side of the substrate, one concludes that the maximum temperature increase will occur on the surface of the film and will be determined by the relationship:

$$\Delta T = \frac{j^2 h^2}{2\kappa\sigma} \equiv \frac{2\pi j^2 h^2 D_m}{\kappa c^2},\quad \text{(Equation 8)}$$

where $\kappa$ is thermal conductivity of the liquid, $\sigma$ is electrical conductivity, and $D_m$ is magnetic diffusivity. For mercury, and the current density and other parameters as at the end of previous section, this yields a very modest temperature increase of 10⁻²° K. On the other hand, for diffraction gratings with periods considerably shorter than 10 $\mu$m, both the current density and the temperature variation increase significantly, because of a strong dependence of the current density on the wave number.

Grazing Incidence Gratings

Grazing incidence gratings, likely to be used in x-ray optics, allow one to reduce requirements to the amplitude of the surface wave. Consider the case where the grating period $\lambda$ is much longer than the wavelength $\lambda_x$ of x rays, $$\lambda_x << \lambda \quad \text{(Equation 9)}$$

We measure the incidence angle $\theta << 1$ from the film surface (not from the normal to the surface). One can show that, under condition of Equation 9, in order to have the first-order maximum shifted from the zeroth-order maximum by an angle comparable to the incidence angle and, at the same time, have a significant suppression of higher-order maximums, one has to fulfil two conditions, $$\theta\lambda \sim 2\pi\xi, \quad \text{(Equation 10)}$$

and $$2\pi\xi\theta \sim \lambda_x, \quad \text{(Equation 11)}$$

where $\xi$ is the amplitude of the surface wave. For the given $\lambda_x$ and $\lambda$ these two conditions then yield the following results for the optimum incidence angle and required amplitude of surface perturbations:

$$\theta \sim \sqrt{\frac{\lambda_x}{\lambda}}, \quad \text{(Equation 12)}$$

and $$\xi \sim \frac{\sqrt{\lambda\lambda_x}}{2\pi}. \quad \text{(Equation 13)}$$

Taking as an example $\lambda \sim 3$ $\mu$m, and $\lambda_x \sim 1.5$ Å, one finds $\theta \sim 10$ mrad, and $\xi \sim 3 \cdot 10^{-7}$ cm. This amplitude, if normalized to $\lambda$, is significantly smaller than the one considered in numerical examples. This, in turn, means that one can drive a smaller current and avoid problems with the film heating. Note that the intrinsic surface roughness previously evaluated is still much smaller than the required amplitude.

Using Dielectric Liquids

One can create diffraction grating based on dielectric liquids. This can be done in the same way as previously discussed in conjunction with dielectric zone plates. As dielectric liquids are generally rather poor reflectors for the normal incidence, one will have to use them in the grazing incidence mode described in the previous section. For the grating period $\lambda \sim 3$ μm and the wavelength of x rays $\lambda_x \sim 1.5$ Å, the amplitude of the surface modulation, as mentioned in the previous section, should be $\xi_0 \sim 30$ Å. For a liquid with not very large dielectric constant, $\epsilon - 1 \sim 1$, creating such perturbations would require a periodically varying electric field whose strength E near the surface can be determined from the following equation:

$$\alpha \xi_0 (2\pi/\lambda)^2 \sim E^2/8\pi \qquad \text{(Equation 14)}$$

For $\alpha \sim 100$ erg/cm$^2$ typical for dielectric liquids, and the other parameters as specified above, one finds that the required electric field strength is $\sim 10^5$ V/cm. This is beyond the breakdown field for liquid dielectrics. Therefore, one may have to resort to a resonant excitation of surface waves, as described. This would bring the required electric field strength down to a more comfortable level of $10^4$V/cm. Note that the potential difference between the wires is quite small (because of small spatial scales involved), in the range of 10V. Among dielectric liquids that can be used in this system are: various alcohols, from ethyl alcohol $C_2H_6O$ to benzyl alcohol $C_7H_8O$; glycerin; heavy hydrocarbons, like $C_9H_{20}$.

Figure 2:
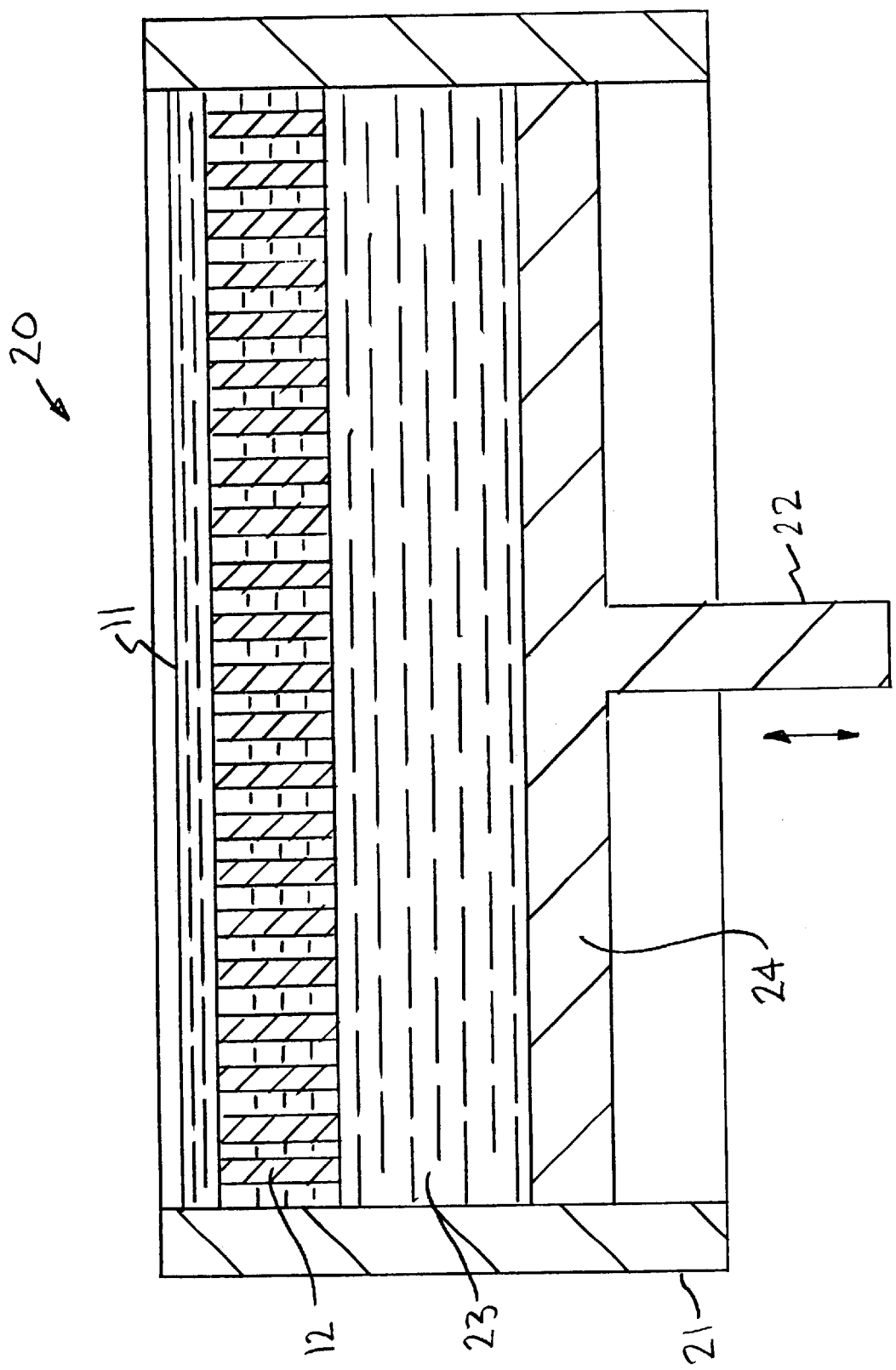
FIG. 2 shows an embodiment of a system for renewing the liquid thin film reflection grating shown in FIG. 1.

Referring now to FIG. 2, another embodiment of a system incorporating the present invention is illustrated. The system is generally designated by the reference numeral 20. The system 20 provides a renewable liquid reflection grating.

The liquid film 11 shown in FIG. 1 is formed by pressing a working fluid 23 through a porous substrate 12. Before the gravitational instability has developed, the liquid is drawn back, and the cycle repeats. The substrate is made of fused capillaries of the same radius $r_{cap}$. Other porous substrates can be used. It is also possible to push and pull the liquid, not by a piston, but by a flexible membrane driven by actuators situated behind it.

The use of wettable and non-wettable substrates is possible. The use of a non-wettable substrate would probably allow a complete removal of the liquid from the outer side of the system during the "in" move of the piston. A mechanical barrier (a rim) of the height approximately equal to the film thickness could be used to prevent the film from spreading laterally. For non-wettable substrate, the pressure in the fluid will be non-negative, so that there will be no concern about cavitation. A wettable substrate (with a non-wettable rim) is also conceivable. However, for the wettable substrate, one can expect that droplets will stick to the areas between the holes of the capillaries and the liquid will not be completely removed from the surface after every pulse. During the "in" motion of the piston, a negative pressure will develop, thereby creating a possibility of cavitation. On the other hand, the droplets will be absorbed by the liquid during the next pulse, and flat surface will be formed again; also, the negative pressures developing during the "in" move are small and shouldn't lead to cavitaiton in a liquid of a normal purity. And, the wettable substrate would allow production of thinner films, with a thickness less than the size of capillaries.

Referring again to FIG. 2, one cycle of the motion of the piston 24 will be described, starting from the position where the liquid film 11 is present on the outer surface of the porous substrate 12. The piston 24 is moved by a piston rod 22. The piston 24 begins moving away from the substrate 12 and, by the end of a half-cycle, "sucks" the liquid 23 out of the capillaries into the volume behind the substrate 12. On the reverse motion, the piston 24 presses the fluid 23 through the capillaries and creates a liquid film 11 with a high-quality reflecting surface. The stroke of the piston 24 is equal to the thickness b of the substrate (plus the film thickness, which is usually negligible compared to b). It may suffice to have a stroke as small as a few thicknesses (h) of the liquid film. A cleaning system can be introduced in this system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A renewable liquid reflection grating, comprising:
   a conducting liquid, and
   electrodes operatively connected to said conducting liquid in an arrangement wherein said electrodes are alternately spaced positive and negative electrodes that produce said reflection grating and are driven by a periodic current with a resonance frequency.

2. The liquid reflection grating of claim 1, wherein said electrodes are positioned in a dielectric substrate.

3. The liquid reflection grating of claim 2, wherein said substrate is a penetrable unit operatively connected to said liquid.

4. The liquid reflection grating of claim 3, wherein said penetrable unit is a porous unit.

5. The liquid reflection grating of claim 3, wherein said penetrable unit is a capillary substrate.

6. The liquid reflection grating of claim 3, including a system for moving said conducting liquid through said penetrable unit to produce said reflection grating.

7. The liquid reflection grating of claim 6, wherein said system for moving said conducting liquid through said penetrable unit is a piston.

8. The liquid reflection grating of claim 6, wherein said system for moving said conducting liquid through said penetrable unit is an actuator.

9. The liquid reflection grating of claim 6, wherein said system for moving said conducting liquid through said penetrable unit is a bellows.

10. The liquid reflection grating of claim 6, wherein said system for moving said conducting liquid through said penetrable unit is a source of fluid pressure.

11. The liquid reflection grating of claim 1, wherein said conducting liquid is a liquid metal.

12. The liquid reflection grating of claim 1, wherein said conducting liquid is mercury.

13. A method of producing a liquid reflection grating, comprising
   providing a conducting liquid,
   positioning electrodes relative to said conducting liquid in an arrangement including alternately spacing positive electrodes and negative electrodes relative to said conducting liquid that produces said reflection grating, and
   actuating them by a periodic current with a resonant frequency.

14. The method of providing a liquid reflection grating of claim 13, including positioning a penetrable unit in an operative position relative to said conducting liquid to withdraw and refresh said conducting liquid.

15. The method of providing a liquid reflection grating of claim 14, wherein said penetrable unit is a porous substrate.

16. The method of providing a liquid reflection grating of claim 15, including moving said conducting liquid through said porous substrate to produce said reflection grating.

17. The method of providing a liquid reflection grating of claim 16, including using a piston to move said conducting liquid through said porous substrate to produce said reflection grating.

18. A method of producing a liquid reflection grating, comprising:

provided a dielectric liquid, positioning electrodes relative to said dielectric liquid in an alternately spaced positive electrodes and negative electrodes arrangement that produces said reflection grating and actuating them by a periodic current with a resonant frequency.

19. The method of providing a liquid reflection grating of claim 18, including alternately spacing positive electrodes and negative electrodes relative to said dielectric liquid in an arrangement that produces said reflection grating.

20. The method of providing a liquid reflection grating of claim 18, including positioning a penetrable unit in an operative position relative to said dielectric liquid to withdraw and refresh said dielectric liquid.

21. The method of providing a liquid reflection grating of claim 20, wherein said penetrable unit is a porous substrate.

22. The method of providing a liquid reflection grating of claim 20, including moving said dielectric liquid through said porous substrate to produce said reflection grating.

23. The method of providing a liquid reflection grating of claim 22, including using a piston to move said dielectric liquid through said porous substrate to produce said reflection grating.

* * * * *